(12) United States Patent
Douglas et al.

(10) Patent No.: US 8,492,921 B2
(45) Date of Patent: Jul. 23, 2013

(54) ROTARY MAGNUS ENERGY HARVESTER

(76) Inventors: Joel S Douglas, Groton, CT (US);
Matthew French, Groton, CT (US);
Paul Richard Johnson, Darien, CT (US); Amanda E Ziegler, Chester, CT (US)

(*) Notice: Subject to any disclaimer, the term of this patent is extended or adjusted under 35 U.S.C. 154(b) by 489 days.

(21) Appl. No.: 12/883,318

(22) Filed: Sep. 16, 2010

(65) Prior Publication Data

US 2011/0001323 A1 Jan. 6, 2011

Related U.S. Application Data

(63) Continuation-in-part of application No. 12/691,951, filed on Jan. 22, 2010, now abandoned.

(60) Provisional application No. 61/276,873, filed on Sep. 17, 2009, provisional application No. 61/206,044, filed on Jan. 26, 2009.

(51) Int. Cl.
*F03B 13/00* (2006.01)
*F03D 9/00* (2006.01)

(52) U.S. Cl.
USPC .............................................. 290/54; 290/43

(58) Field of Classification Search
USPC .............................. 290/43, 44, 54, 55; 416/85
See application file for complete search history.

(56) References Cited

U.S. PATENT DOCUMENTS

| 4,366,386 A * | 12/1982 | Hanson | 290/44 |
| 4,446,379 A * | 5/1984 | Borg et al. | 290/55 |
| 7,504,740 B2 * | 3/2009 | Murakami et al. | 290/55 |
| 7,781,905 B2 * | 8/2010 | Newman | 290/54 |
| 7,986,054 B2 * | 7/2011 | Douglas | 290/54 |

OTHER PUBLICATIONS

A Study on Savonius Type Magnus Wind Turbine, Ito et. al., 202_Ewec2007fullpaper.pdf, entire document.

* cited by examiner

*Primary Examiner* — Nicholas Ponomarenko
(74) *Attorney, Agent, or Firm* — Stephen E. Zweig

(57) ABSTRACT

An energy harvester capable of providing motion from fluid flow, which comprises at least one Magnus cylinder driven to rotate by the movement of the fluid past a fin device. This causes the Magnus cylinder to rotate, and further interactions between the rotating Magnus cylinder and the moving fluid generate a Magnus lifting force. A channel or system may be also provided to direct the fluid flow to the Magnus cylinder. This rotating Magnus cylinder configuration is integrated into a mechanical device that is designed to transfer the Magnus lifting forces into a rotary mechanical motion to drive an electric generator. The device can be utilized in either air or hydraulic environments. A modification of the energy harvester can also be configured to utilize the generated electricity to produce hydrogen for use in fuel cells, or for combustion.

25 Claims, 15 Drawing Sheets

ROTARY MAGNUS ENERGY HARVESTER

CROSS REFERENCE TO RELATED APPLICATIONS

This application claims the priority benefit of U.S. Provisional Patent Application No. 61/276,873 filed Sep. 17, 2009, the contents of which are incorporated herein by reference. This application is a continuation in part of, and claims the priority benefit of, U.S. patent application Ser. No. 12/691,951, flied Jan. 22, 2010; U.S. patent application Ser. No. 12/691,951 in turn claims the priority benefit of U.S. provisional application 61/206,044, flied Jan. 26, 2009.

BACKGROUND OF THE INVENTION

1. Field of the Invention

The present invention relates to wind and water powered energy harvesters, in particular Magnus type power generators.

2. Description of the Related Art

Although, Savonius turbines have previously been used as effective fluid (e.g. wind, water) motion power generators, this design has the drawback that the Savonius turbine cannot rotate faster than speed of the moving fluid. As a result, Savonius turbines are not suitable for high power generation, and are generally used only in applications where low power generation capability is acceptable.

By contrast, alternative turbine designs, such as propeller type designs, can provide high power generation capability, at least in higher wind speed situations, but such propeller designs often operate with low efficiency when wind speed is low.

Other types of fluid motion power generators are also known. For example, Magnus type power generators. Magnus power generators utilize the Magnus force or "lift" that is generated when one or more fixed (relative to a horizontal rotary shaft) but rotating cylinders rotate in a moving fluid environment. The Magnus force operates in a direction perpendicular to the axis of rotation of the cylinder, and because many prior art Magnus forces used the rotating cylinders in a fluid environment where the axis of rotation of the cylinder was horizontal, and the fluid movement was also horizontal but generally perpendicular to the axis of rotation of the cylinder, the resulting force direction was often in a vertical or "up" direction, and thus the term Magnus "lift" is often used to refer to this Magnus force, even when the actual direction of the force is not always in an upward direction.

This Magnus force or lift can be used, for example, to rotate a horizontal rotary shaft, which in turn can be harnessed to do useful work, such as electrical power generation.

Prior art on such Magnus type power generation methods and devices includes U.S. Pat. No. 4,366,386; U.S. Pat. Nos. 4,717,832; U.S. Pat. No. 4,582,013; U.S. Pat No. 5,074,710; and U.S. Pat No. 5,222,833; the disclosures of which are incorporated herein by reference.

U.S. Pat. No. 7,504,740 to Murakami et. al. describes a Magnus type wind power generator that includes a horizontal rotary shaft for transmitting torque to a windmill-like power generating mechanism. Here the Magnus rotary cylinders are disposed radially on a horizontal rotary shaft. Driving motors rotatively drive the respective Magnus rotary cylinders around the main axes of the Magnus cylinders. The relative action between rotation of each Magnus rotary cylinder, and the wind, produces Magnus forces perpendicular to the axis of rotation of the various rotating Magnus force cylinders. These cylinders in turn rotate the horizontal rotary shaft, which in turn is coupled to an electrical power generating mechanism such as an electrical generator. The invention also teaches an air flow device that may be used to increase the Magnus lifting force, which may be installed on the outer peripheral surfaces of the rotary cylinders.

A similar design was also taught by Ito et. al. in "*A study on Savonius Type Magnus Wind Turbine*" Ewec 2007 proceedings.info, 2007.

BRIEF SUMMARY OF THE INVENTION

One drawback of the Magnus type power generators described in the prior art is that in order to harness the power in a moving fluid, the Magnus cylinders must first be rotated using electric motors that are attached to the Magnus cylinder shaft. The interactions between the rotating cylinders, and the moving fluid, generates the Magnus force (lift) which in turn can be harnessed to generate electrical power. However, if the fluid flow is otherwise constant, in order to increase the amount of generated electrical power, a greater Magnus force (lift) is needed, and to achieve this greater Magnus lift, it is necessary to use the electric motors to increase the rotational speed of the rotary cylinders still further. This requires the consumption of a large amount of energy to power the electric motors, which in turn decreases the overall power generation efficiency of the system.

Prior art also describes wind powered Savonius type rotors. Savonius type rotors essentially are an asymmetric type of rotary air scoop mounted on a shaft where the open end of one scoop catches wind, thus providing force that rotates the other scoop around the shaft axis. Because the other scoop has its open end oriented in the opposite direction, its streamlined closed end is able to move through the air with less resistance, thus resulting in rotary motion.

Such Savonius rotors are very inefficient, and are not able to rotate faster than the wind speed. As a result, using prior art designs, it was essentially impossible to increase the rotational speed of the Magnus force providing rotary cylinders beyond the speed of the wind that is powering the system. As a result, it was difficult to generate large amounts of energy, and such devices were unsuitable for efficient electric power generation.

Other prior art rotary Magnus designs used a different approach. To provide greater power generation efficiency through greater Magnus force or lift provided by faster rotating Magnus cylinders, co-pending application U.S. patent application Ser. No. 12/691,951, the disclosures of which are incorporated herein by reference, taught a Magnus type power generator that included a horizontal rotary shaft that transmits a rotation torque to a power generating mechanism, rotary cylinders that were disposed radially from this horizontal rotary shaft and located distally along the shaft, and a drive mechanism that was in communication with both the rotary cylinders and a driving motor. The driving motor drives the Magnus force rotary cylinders around their respective axes, and the Magnus lift generated by interactions between the Magnus force rotary cylinders and the fluid flowing past the cylinders is used to rotate the horizontal rotary shaft, which in turn drives the power generating mechanism. However as previously discussed, such electrical motor driven systems themselves use electrical power, thus reducing the overall power efficiency of the system, and addition tend to be more expensive and mechanically complex.

Thus it would be desirable to produce energy harvesters that are capable of achieving higher efficiency by higher speed Magnus cylinder rotation, as well as other efficiency improvements, but which do not require the need to reduce the operating efficiency of the system by using valuable generated electrical power just to rotate the Magnus cylinders.

The present invention provides an improved Magnus type fluid (e.g. wind and water) power generator which is able to provide higher levels of power by rotating Magnus cylinders at higher rotational speeds, including speeds in excess of the wind or fluid velocity, thus overcoming the prior art problems associated with Savonius rotors, while at the same time avoiding the higher expense, lower reliability, and electrical power consumption problems associated with the use of electrical motor Magnus cylinder rotation methods.

According to the present invention, an improved Magnus type wind (or fluid) power generator is described that harnesses the power provided by the moving fluid to spin the Magnus cylinders at high rotational speeds. These Magnus cylinders in turn again harness the power provided by the moving fluid and provide the Magnus lift that rotate the invention's horizontal rotary shaft, which in turn drives the power generating mechanism. Thus the present invention extracts more energy from the moving wind or fluid than was previously possible. As a result, the invention generates electric power efficiently at low fluid speeds, and is also capable of operating at relatively high fluid speeds as well.

The present invention uses fin or finned device (e.g. a turbine blade, Savonius turbine, screw or a fan assembly), to first extract power from the moving fluid. In some embodiments, the invention may make use of a double (inner and outer) shaft design, where various Magnus rotating cylinders are attached to the outer shaft, often in a radial fashion. The Magnus cylinders rotate in two directions. They rotate in first direction around their axis of attachment to the outer shaft, and rotate in a second direction as the outer shaft itself revolves inside the energy harvester device.

The fin or finned device, which may often be located near the fluid intake region of the system, captures energy from the fluid and uses this energy to drive a shaft, such as an interior shaft, that in turn is used to rotate the Magnus rotary cylinders about their first direction around their axis of attachment to the outer shaft. By locating the finned device near the fluid intake the finned device cause turbulence and the turbulence is beneficial to the lift created by the Magnus cylinders. The Magnus force lift created by the movement of the fluid over the rotating Magnus rotary cylinders and the rotation of the Magnus cylinders is then captured by the outer (exterior shaft), causing this exterior shaft to rotate in a second direction. This outer shaft will then often will be in communication with an electricity generator, and the captured energy will then be harnessed to perform useful work.

The fin device often will be attached to the inner (driving) shaft of the double shaft design, and will often rotate due to the force of fluid flow past the fin device. The rotating inner shaft can then communicate rotational energy to the various Magnus cylinders (in the first direction), often through a gear arrangement. The fin device has the additional advantage that if mounted near the fluid intake for the system; the fin device will induce turbulence in the incoming fluid, which in turn will interact more favorably with the various Magnus cylinders as they rotate through the fluid in the second direction.

The Magnus cylinders may be longitudinally separated in pairs so that flow from the first or leading cylinder is accelerated and further accelerated by the second or next cylinder which is in the rear of the first cylinder and positioned at least 30 degrees out of phase but not more than 179 degrees out of phase of the first cylinder.

This Magnus cylinder positioning allows the fluid to be accelerated down the longitudinal length of the machine, and be further accelerated by each downstream cylinder, thereby increasing the torque created by the lift of each Magnus cylinder, which in turn translates into increased torque in the second direction, and more energy to drive generators and other useful devices. The present invention is not limited with regard to the number of cylinder pairs, or the type of fan devices used to rotate the cylinders or that can be installed, however, as any number of cylinder pairs can be installed to generate the desired torque.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
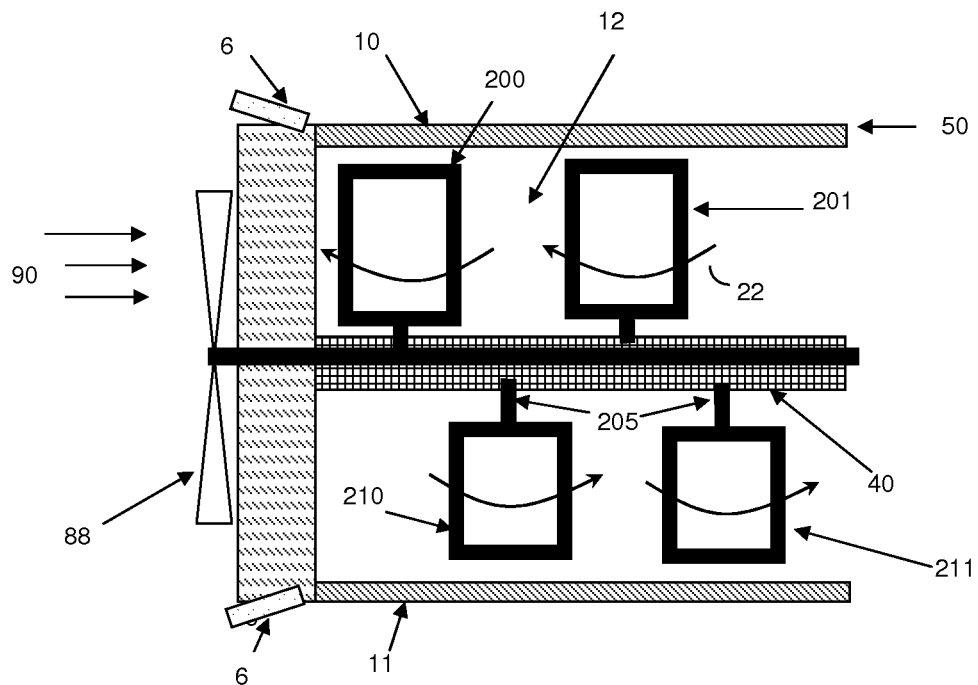
FIG. 1 is a schematic side view representation of a radial device with staggered rotating Magnus cylinders in an axial position within a channel defined by walls.

As used herein, the term "hydro application" and "hydraulic" are used to describe the use of the energy harvesting device with regard to liquid, and the term "gas application" and "pneumatic" are used to describe the use of the energy harvesting device with regard to gas (e.g., air).

As used herein, the term "lift" refers to a force that is perpendicular to a direction of fluid flow.

As used herein, the term "electrical grid" refers to any system used to utilize or transport electrical current.

The invention is based, in part, upon the realization that higher efficiency Magnus force based energy harvesters can be produced by devising methods to better harness the force of the moving fluid to rotate the Magnus cylinder components of the energy harvesters at higher speeds.

Based upon this insight, the invention then defines the problem to be solved is to devise specific methods to increase the power generation of the Magnus device by utilizing the motion of the moving fluid (air or water) to increase the rotational speed of the Magnus cylinders to a rotational velocity that at the circumference of the cylinder can be in excess of the speed of the moving fluid itself.

Thus in one embodiment, the invention may be an energy harvester device comprising at least one Magnus cylinder with a first axis of rotation and a circumference. This at least one Magnus cylinder may be affixed by a mechanism attached to the cylinder's first axis of rotation to the outer portion of a central shaft that rotates on an axis that substantially parallel to the direction of a fluid moving at a fluid velocity with a direction and speed. This central shaft itself will have its own axis of rotation that is substantially parallel to the direction of the fluid. The device will have at least one fin (often a plurality of fins, propellers, turbine blade or blades, Savonius turbine, screw, fan assembly, or other finned device) that interact with the moving fluid, and this interaction will produce torque on the fin. Then, with the aid of force transuding mechanisms (everything from gears and belts to even electrical generators and motors), this torque generated by the interaction between the moving fluid and the at least one fin will be translated into rotary motion of this at least one Magnus cylinder about its first axis.

As a result of this rotary motion and the movement of the fluid past the Magnus cylinder, the Magnus cylinder will produce a Magnus "lift" force, generally perpendicular to the first axis of rotation of the Magnus cylinder, that is capable of causing the outer portion of the central shaft to rotate in a direction with an axis of rotation that is substantially parallel to the moving fluid. This will cause the least one Magnus cylinder to rotate about this central shaft in a manner somewhat like that of a windmill, and the cylinder will travel in a circular arc in a direction that is substantially perpendicular to the direction of the moving fluid.

Here, due to the invention's improved force traducing mechanisms and the design of the fin, the fin and force transuding mechanisms cause the circumference of the at least one Magnus cylinder(s) to move at a radial velocity that is substantially greater than the speed of the fluid. This increases the efficiency of power production over prior art devices. The central shaft of the device is normally coupled to a mechanism that converts the movement of the central shaft into useful work, such as, for example, producing electrical power using an electrical generator.

In one preferred embodiment of the invention, the fluid flow is used to separately rotate one or more different types of fin devices. These fin devices are in turn attached to a central drive shaft that is rotatably in communication with the various Magnus cylinder components of the energy harvester device. Here the term "fin" is used broadly to encompass a turbine or turbine blade, Savonius turbine, screw, or fan assembly.

According to this aspect, as the Magnus energy harvester operates, the motion of the fluid past the fin (turbine blade, Savonius turbine, screw or a fan assembly) is coupled to a first shaft (Magnus cylinder rotation shaft) that rotates the Magnus rotary cylinders. The lift created by the motion of the fluid past the rotating Magnus cylinders in turn then drives a secondary shaft which is in communication with an electricity generator.

In another embodiment of the invention the fin that drives the Magnus cylinder rotation shafts may co-exist with a secondary driving motor that can also rotate the Magnus cylinders. In this embodiment, the torque developed by the fin devices helps supplement or assist the secondary driving motor in rotating the Magnus cylinders, thereby reducing the torque required by the secondary driving motor, as well as potentially the secondary driving motor's size and power consumption.

Figure 2:
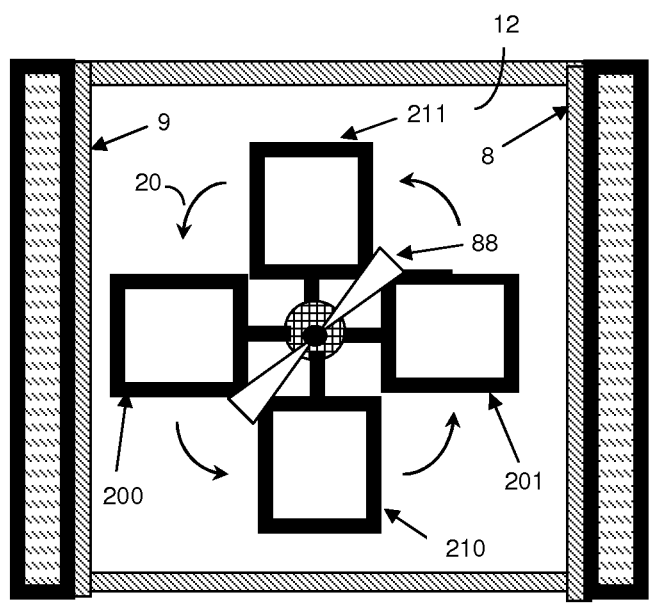
FIG. 2 is a schematic end view representation of a radial device with staggered rotating Magnus cylinders in an axial position within a channel defined by walls.
Figure 3:
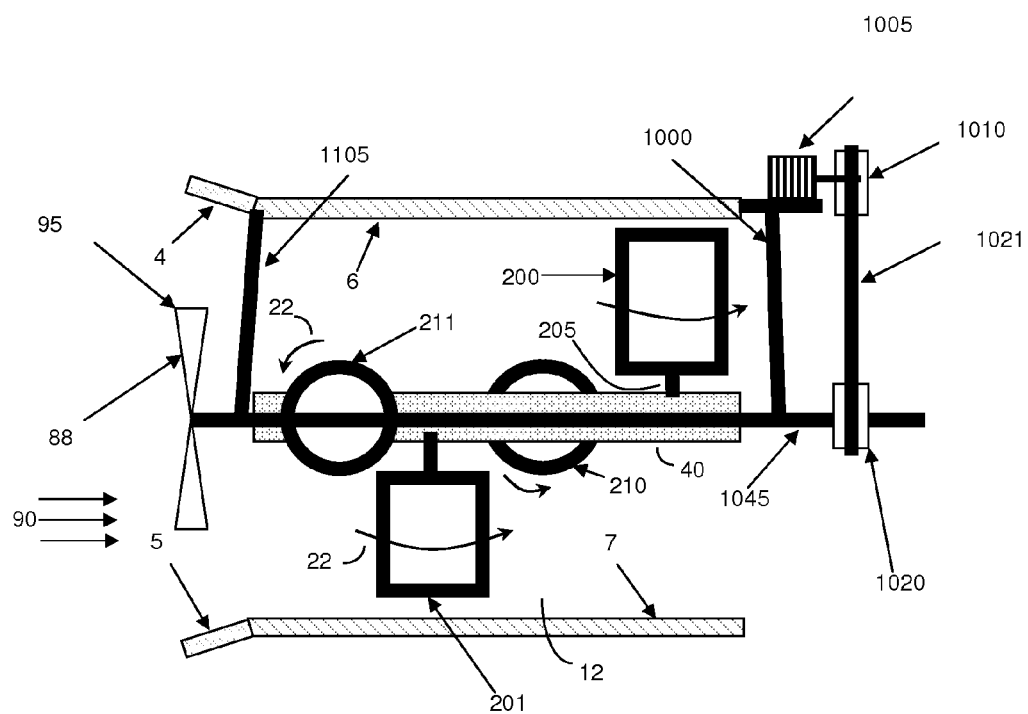
FIG. 3 is a schematic top view representation of a radial device with staggered rotating Magnus cylinders in an axial position within a channel defined by walls.
Figure 7:
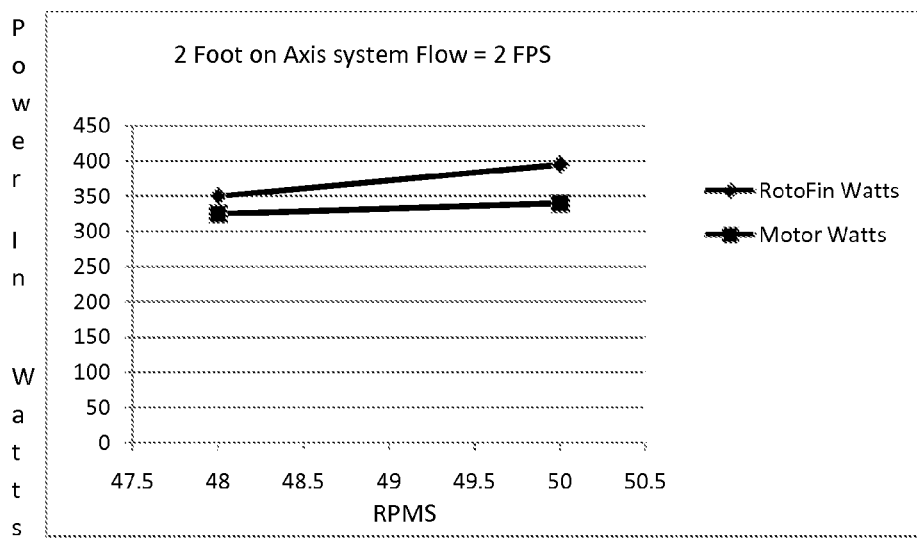
FIG. 7 is a graphical representation of the power in watts vs. RPM with and without a motor for a flow of 2 feet per second for a machine schematically shown in FIGS. 4 and 5.
Figure 8:
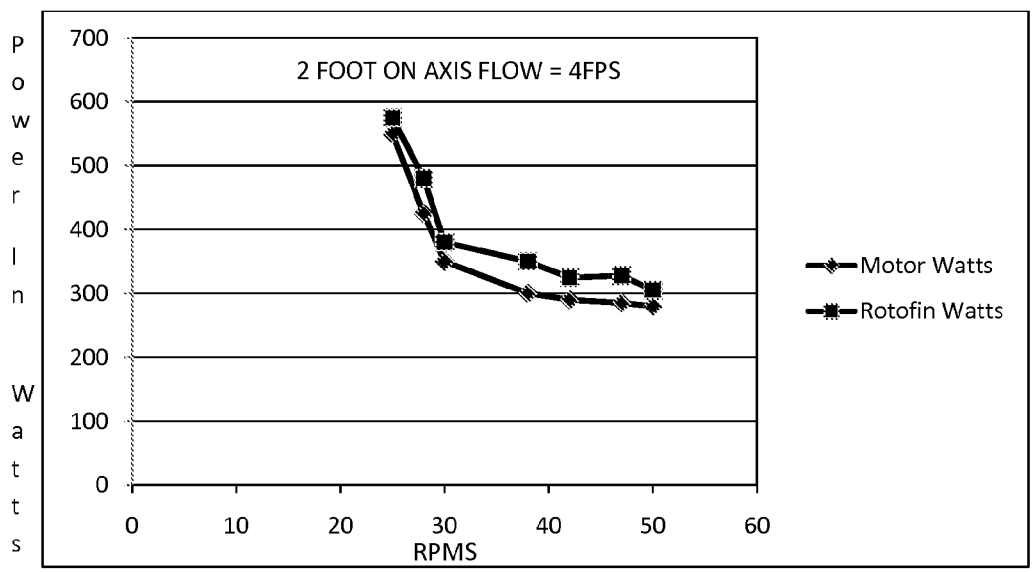
FIG. 8 is a graphical representation of the watts vs. RPM with and without a motor for a flow of 4 feet per second for a machine schematically shown in FIGS. 4 and 5.

An energy harvester for use in fluid flows according to the present invention is shown in FIGS. 1, 2 and 3. Here the energy harvester is mounted to a structure where the energy harvester is in communication with a fluid flow 90. As shown in FIGS. 7 and 8 the power produced is higher when fined device is utilized to drive the Magnus cylinders. The fin device has the added benefit for the Magnus cylinders of inducing turbulent flow into the energy harvesting chamber. This increase in turbulence reduces the drag of the Magnus cylinder movement in the fluid flow thereby increasing the energy that can be extracted.

The energy harvester may comprise inflow fluid channel walls 4, 5, 6 and 7, as well as energy harvester channel side walls 8, 9, 10, and 11 that receive a flow 90 from the fluid inflow channel walls 4, 5, 6 and 7. A main shaft 40 may be located within a channel 95, defined by the inflow fluid channel walls 4, 5, 6, and 7 and the channel side walls 8, 9, 10, and 11 in which the fluid flow 90 is received.

Figure 4:
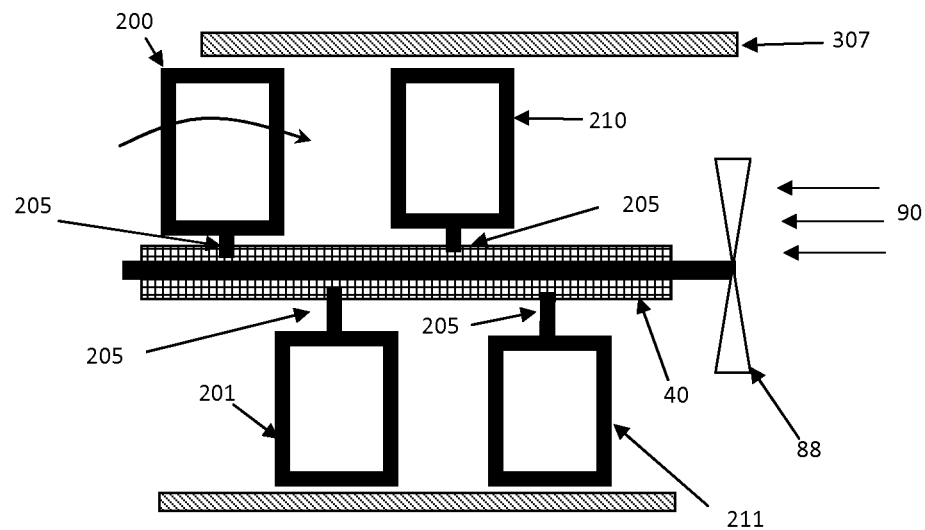
FIG. 4 is a schematic side representation of a radial device with staggered rotating Magnus cylinders in an axial position within a tube.
Figure 5:
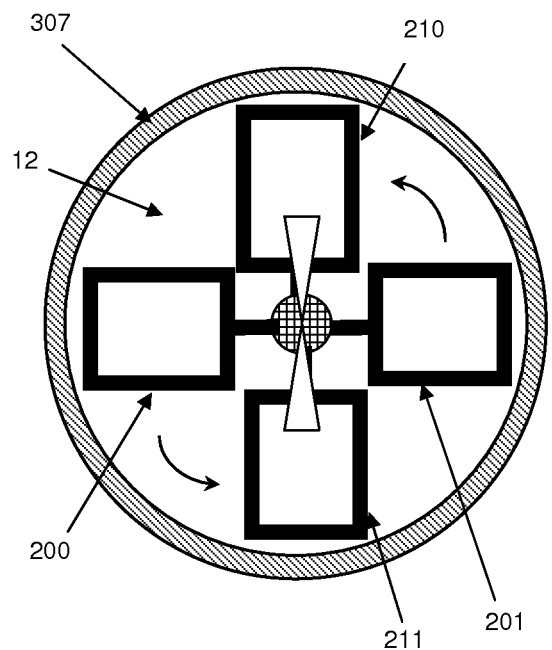
FIG. 5 is a schematic end representation of a radial device with staggered rotating Magnus cylinders in an axial position within a tube.

In this example, Magnus cylinders 200, 201, 210, and 211 are each mounted on a respective central axis 205 between the main shaft 40 and channel side walls 8, 9, 10 and 11. They will rotate around the main shaft in a clockwise or counterclockwise direction 20, as well as rotate around their central axis 205 as shown in 22. The walls can also be replaced with a tube 307 as shown in FIG. 4 and FIG. 5.

The fluid flow path may be defined by an inflow fluid channel formed by inflow fluid channel walls 4, 5, 6 and 7, and by an outflow fluid channel formed by channel side walls 8, 9, 10 and 11, as well as an energy harvester chamber 12 disposed between the inflow fluid channel and the outflow fluid channel. This energy harvester chamber is formed from channel side walls 8, 9, 10 and 11.

The channel side walls can also be curved (See FIG. 5), either in the side or bottom walls in this configuration, and can also have opposite elevations in the plane parallel to the fluid flow path. This can act as a concentrator for the fluid flow, by channeling a greater volume of fluid to the energy harvester (thereby increasing the speed of the fluid that will increase the lift generated by the cylinder). This fluid flow intensification scheme can be used in any of the embodiments envisioned by the present invention.

As shown in FIG. 3, the fin device 88 may be located on Magnus cylinder drive shaft 1045, and is rotated by fluid flow 90. The imparted rotation from the fin device 88 (due to fluid flow 90) in turn drives shaft 1045. Shaft 1045 in turn drives the bevel gears 1050, 1055, 1060 and 1065, which are shown in more detail in FIG. 6. The fin device 88 can be located at either the proximal or distal end of the Magnus cylinder drive shaft 1045 when viewed from the fluid flow 90 perspective.

The rotational motion from shaft 1045 is then imparted into shafts 1205 and 1215, which rotate Magnus cylinders 1200 and 1210 (shown in FIG. 6) or Magnus cylinders 200, 201, 210, and 211 (shown in FIGS. 1,2 and 3). An optional supplemental motor 1005 (shown in FIG. 6) can also be attached to provide rotational motion to shaft 1045 to either increase the speed of rotation of the shaft 1045, alternatively rotate shaft 1045 when flow 90 is insufficient to rotate fin device 90.

Figure 9:
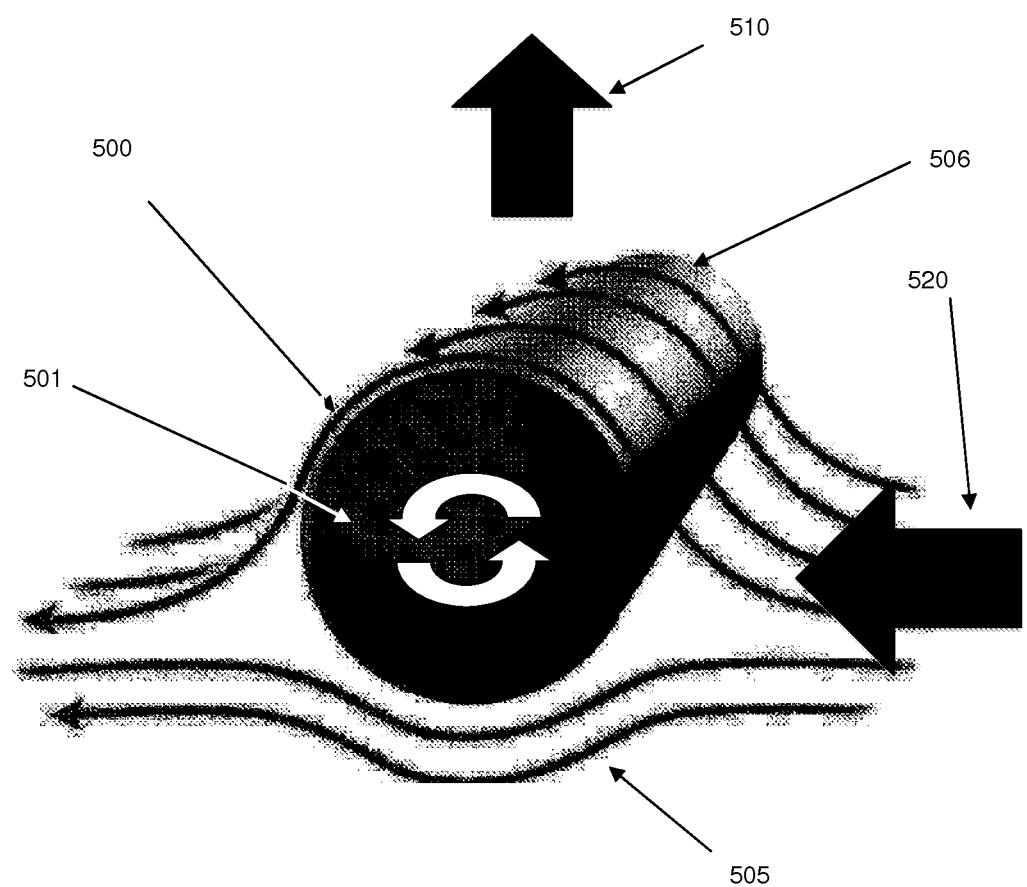
FIG. 9 is a schematic representation of the Magnus cylinder force diagram.

The Magnus lifting force is developed as shown in FIG. 9. To increase the Magnus force lift, the energy harvester is replicated within 1-20 diameters of the Magnus cylinder. The as previously discussed, fluid flow 90 can be hydraulic or pneumatic (air or gas).

The Magnus cylinders are typically mounted inside a channel formed by a passage defined by the opposed channel side walls, an optional bottom chamber wall, the inflow fluid channel walls, and the outflow fluid channel walls. This passage directs the flow through the energy harvester. The cylinders are oriented transversely to the flow through the passage and are mounted for rotation, for example, via bearings 1080 and 1085 in cylinder supports 1000 and 1105 shown in FIG. 6.

Figure 6:
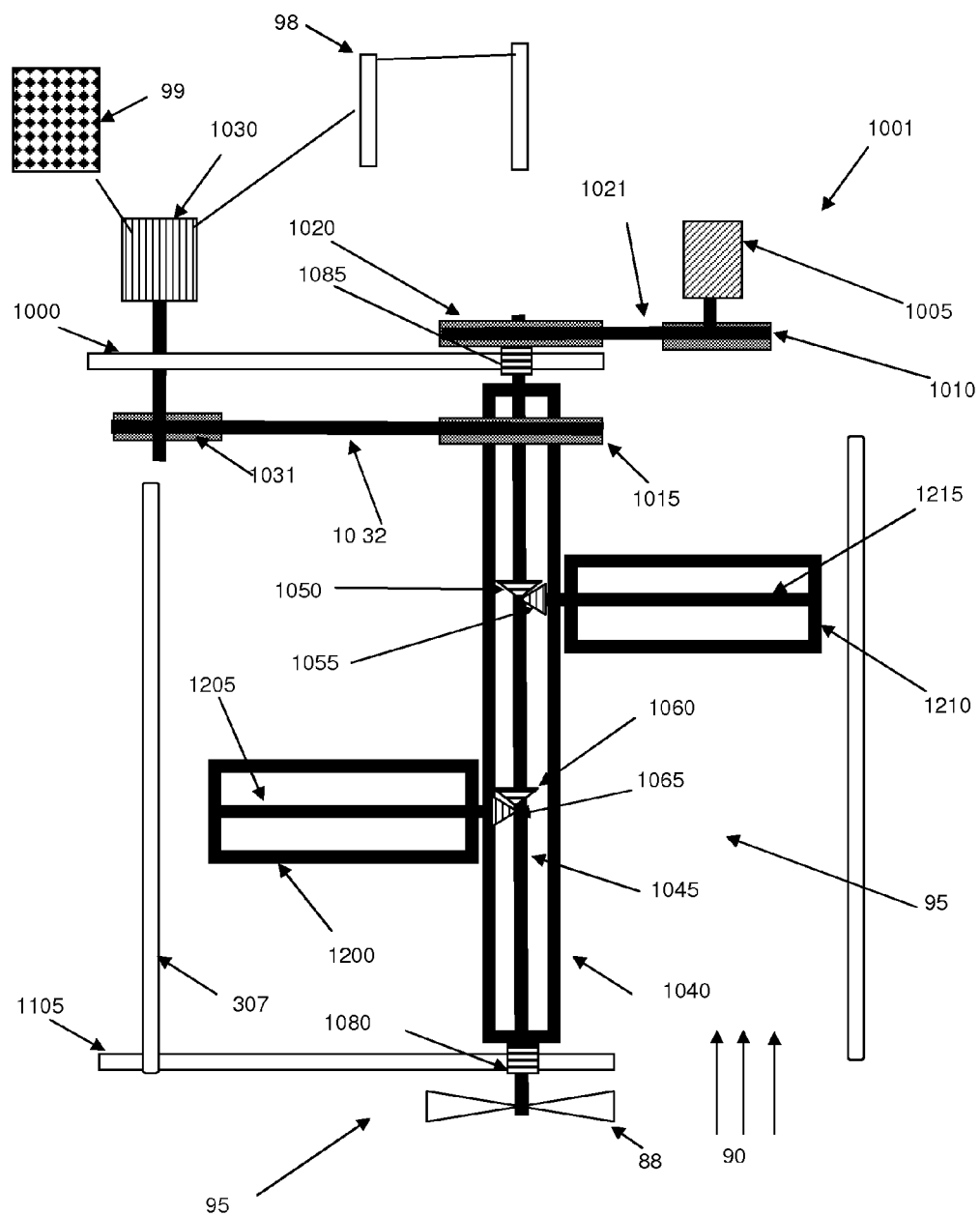
FIG. 6 is a schematic representation of a double concentric shaft used to drive the Magnus cylinders and transmit the power to the generator.

The Magnus cylinders may be rotated by a drive mechanism as shown in FIG. 6. As a result of fluid flow 90, the fin device 88 drives shaft 1045, which in turn drives the bevel gears 1050, 1055, 1060 and 1065 as previously discussed. The fin device 88 can be located at either the proximal or distal end of the Magnus cylinder drive shaft 1045 when viewed from the fluid flow 90 perspective.

Figure 21:
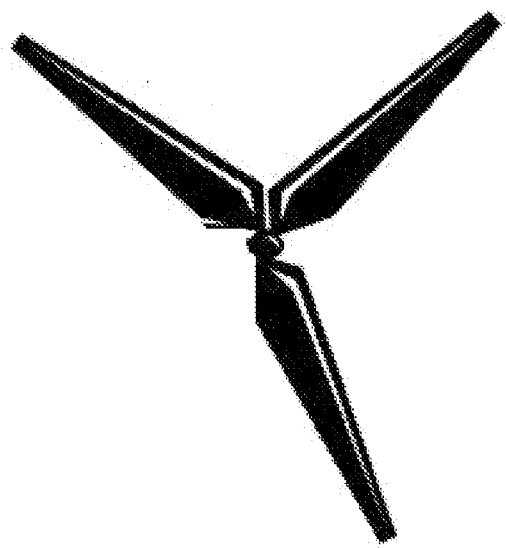
FIG. 21 shows a typical fin means in the form of a turbine blade.
Figure 22:
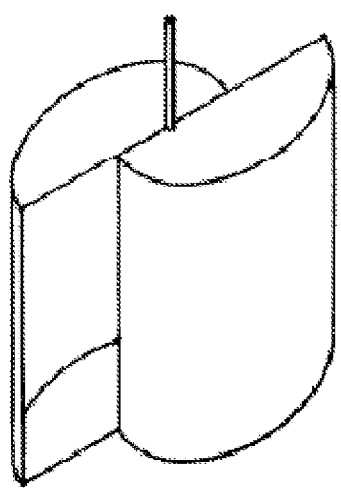
FIG. 22 shows a typical fin means in the form of a Savonius turbine.
Figure 23:
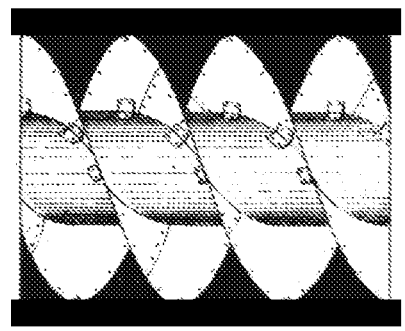
FIG. 23 shows a typical fin means in the form of a screw/auger.
Figure 24:
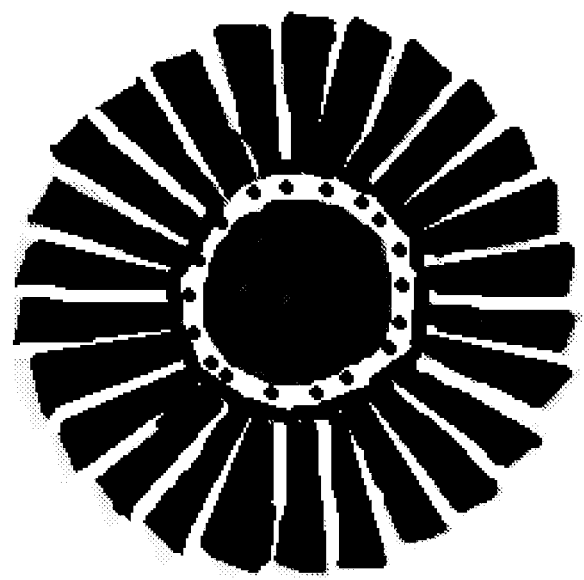
FIG. 24 shows a typical fin means in the form of a fan.

Various types of devices may be used as fin device 88. The fin device may be a turbine blade as shown in FIG. 21, or a Savonius turbine as shown in FIG. 22, a screw/auger as shown in FIG. 23; or a fan as shown in FIG. 24. All types of fin device, however, will generally provide rotation to shaft 1045 which then drives shafts 1215 and 1205 which rotates Magnus cylinders 1200 and 1210.

When the flow 90 is concentrated through the channel 95 and past the cylinders 1200 and 1210, the Magnus cylinder rotation will produce a Magnus force lift.

Here an unexpected benefit in shifting from prior art motor driven Magnus cylinder designs has been found. Surprisingly, it has been found that an additional advantage of using fin device 88 is that fin device 88 acts to increase the turbulence of fluid flow 90 when located at the proximal end of the Magnus cylinder drive shaft 1045 when viewed from the fluid flow 90 perspective.

The more turbulent fluid flow 90 will in turn interacts with the Magnus cylinders in a way that both reduces the drag of the Magnus cylinders and allows them to rotate faster, further increasing the energy produced by the energy harvester. This further increases overall energy harvester efficiency. By contrast, the prior art motor driven designs did not increase the turbulence of fluid flow 90, and thus did not exhibit this effect.

The flow through the channel 95 in tube 307 travels past the Magnus cylinders 1200 and 1210, and in turn forces the mechanism to rotate the main shaft 1040. This causes the drive mechanism to rotate generator 1030.

Concentrating the moving fluid in the channel further accelerates the flow by funneling the fluid towards the cylinders 1200 and 1210. Interestingly and unexpectedly however, this fluid flow acceleration in energy harvester chamber 12 is further amplified by the Magnus cylinders themselves, additionally increases the Magnus force lift. As the fluid flows past successive Magnus cylinders, the fluid flow is further accelerated by each prior Magnus cylinder, and this in turn increases the lift for successively positioned Magnus cylinder in the fluid flow path.

Note that each successive Magnus cylinder may, but need not, have the same cylinder diameter. That is, the diameters of the cylinder 1200 and 1210 may be the same, or they may vary relative to each other. The relative cylinder diameters may be optimized by experiment or by fluid dynamic computation methods.

Thus replacing the Magnus cylinder drive motor with a fan device has several advantages. In addition of avoiding the patristic loss of generated electrical energy that must be diverted to the Magnus drive motor, the fan device increases the turbulence of the fluid flow past the rotating Magnus cylinders, which reduces fluid drag on the Magnus cylinders. This lesser fluid drag in turn increases system efficiency.

FIGS. 4 and 5 show a rotational system that uses the fluid flow in the channel to rotate the cylinders in perpendicular fashion to develop lift perpendicular to the flow. Here the energy harvester chamber may be in the shape of a pipe 307. This design makes the device well suited for in-pipe operation.

The round pipe shape further increases the torque created by the lift of the cylinders by keeping the fluid contained in a focused energy harvester chamber 12. The increase in torque is due to 1) the increase in speed of the water (or fluid) due to the acceleration of the water around the Magnus cylinder and 2) the higher speed water interacting with the Magnus cylinder in a positive manner, thereby generating higher Magnus lift forces and more torque. To increase the torque caused by the Magnus force lift, multiple Magnus cylinders may be used. Typically additional Magnus force cylinders may be replicated or added. Here the spacing of the additional Magnus force cylinders should generally be within 2-20 diameters of the Magnus cylinder in the downstream direction of the flow. That is, if the additional downstream Magnus cylinder is located too close to the upstream Magnus cylinder (less than about 2 Magnus cylinder diameters), then efficiency will suffer. If the additional downstream Magnus cylinder is located more than about 20 Magnus cylinder diameters from the upstream Magnus cylinder, than an opportunity to harvest more energy from the moving fluid may have been wasted, and again efficiency may suffer.

In FIGS. 4 and 5, the fin device 88 is located on Magnus cylinder drive shaft 40, and is rotated by fluid flow 90. As before, fluid flow 90 can be hydraulic or pneumatic (air or gas).

FIG. 6 shows the double shaft 1040, 1045, the inner part of which 1045 transmits torque to drive the rotation of the Magnus cylinders and outer part of which 1040 rotates to transmit the lifting force from the Magnus cylinders to the generator. In this example, a supplemental Magnus cylinder rotation motor 1005 is connected to pulley 1010. A belt 1021 transmits torque from pulley 1010 to pulley 1020 to drive shaft 1045 supported in bearings 1085 and 1080. The belt, 1021 may be any type of force transmitting belt, including v-belts, ribbed belts, cogged belts, roller chain, and cables. The supplemental Magnus cylinder rotation motor 1005 can be operable under electric, pneumatic, or hydraulic power, and can also be reversible to allow the rotation of the central shaft 40 to be the same direction if the flow 90 is reversed.

Force from fin device 88, possibly supplemented by motor 1005, drives the shaft, 1045, which in turn drives the central axes 1205 and 1215, thereby causing Magnus cylinders 1200 and 1210 to rotate.

Figure 19:
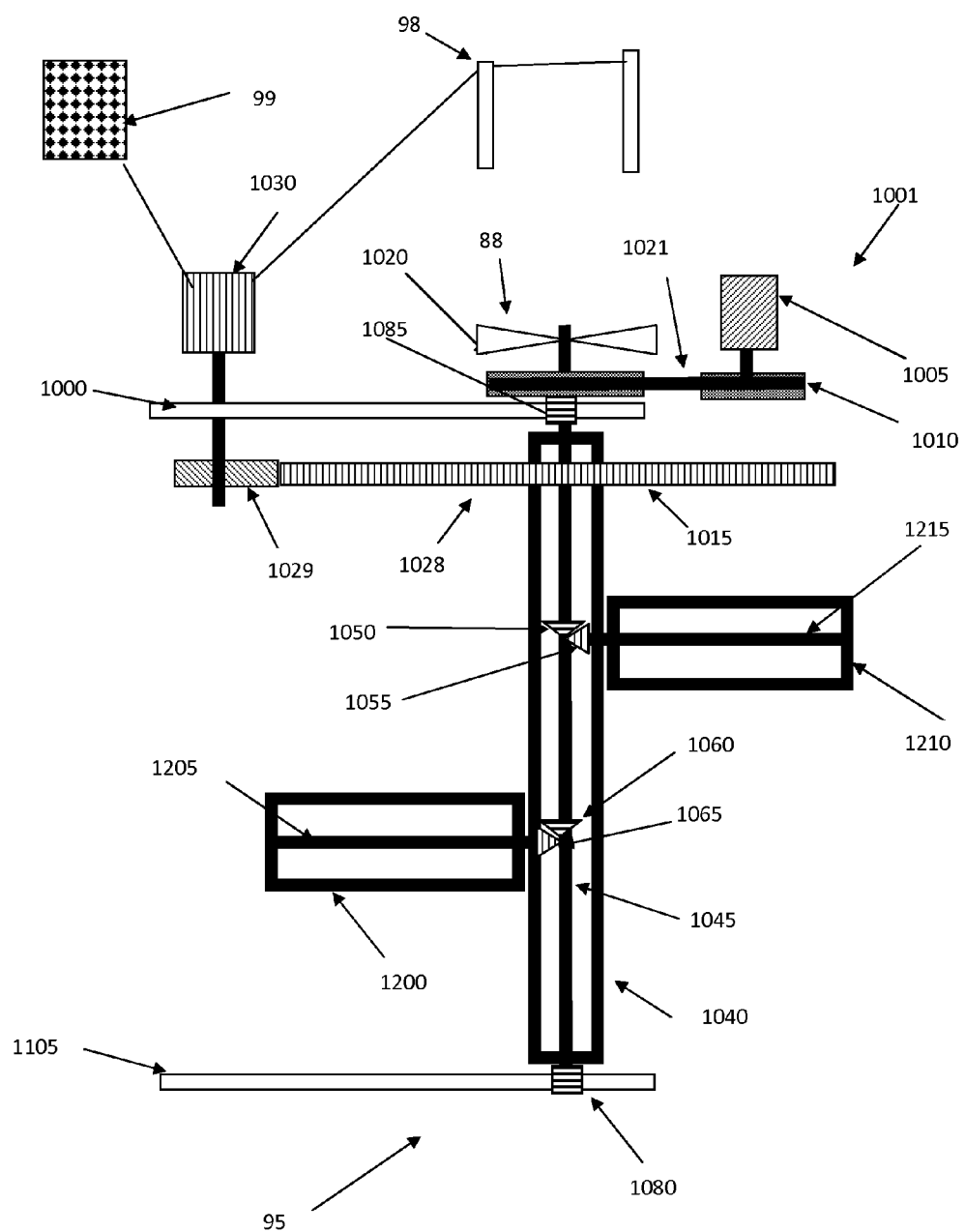
FIG. 19 is a schematic representation of an energy harvester incorporating a pinion gear to drive a generator.

When subjected to flow 90 (as shown in FIGS. 4 and 5), rotating Magnus cylinders generate Magnus force lift. This lift then causes the outer shaft 1040 to rotate which in turn drives the drive pulley 1015 to drive generator drive pulley 1031 (via belt 1032) to drive the generator 1030. A pinion gear 1029 or bull gear 1028 may be used to drive the generator 1030 as shown in FIG. 19. Generator 1030 can be attached to battery 99 or to electrical grid 98.

Figure 20:
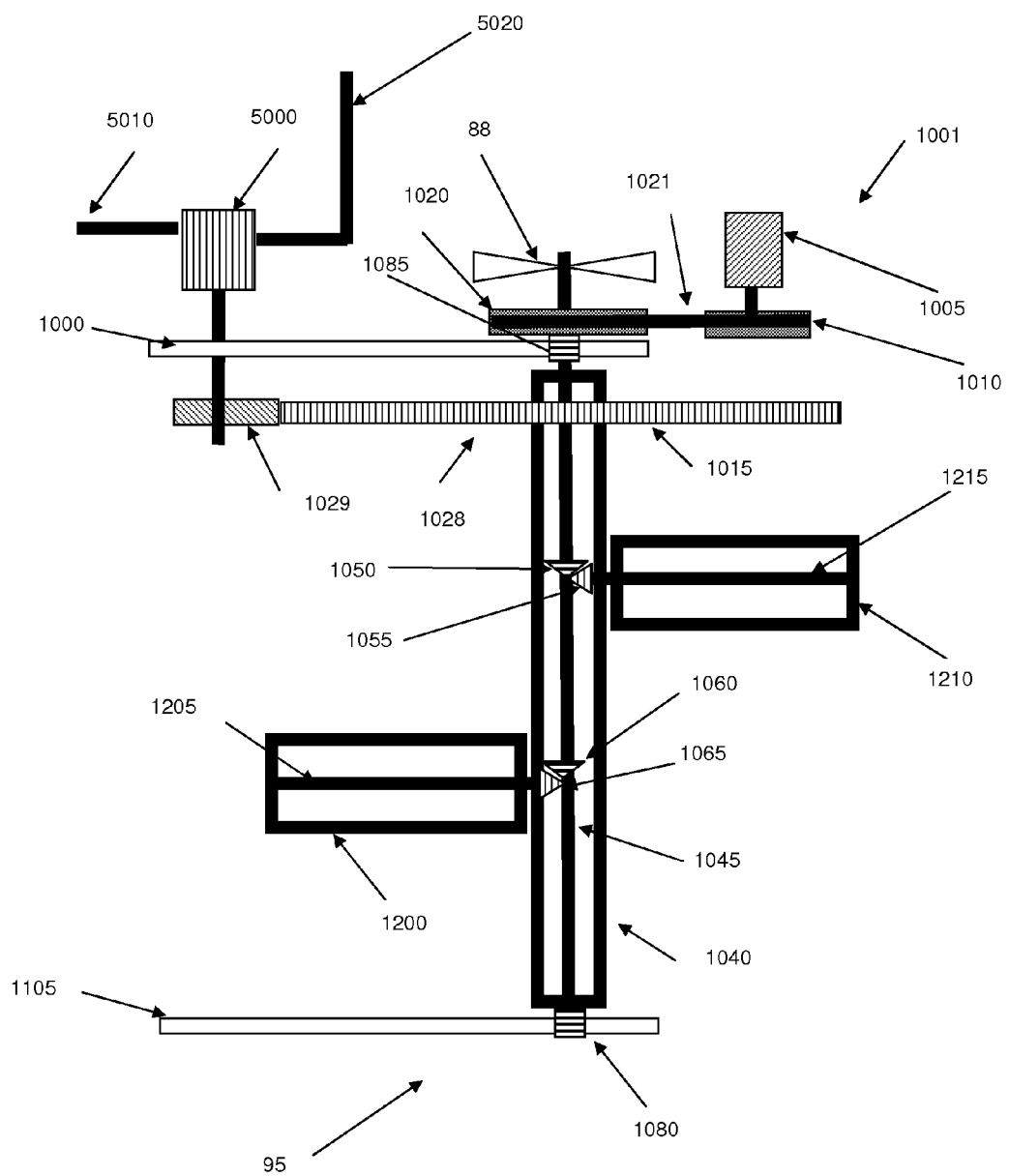
FIG. 20 is a schematic representation of an energy harvester incorporating a pinion gear to drive a pump.

The generator 1030 can alternatively be replaced with a pump 5000 as shown in FIG. 20 to pump fluids such as air or water. The pump 5000 input for the fluid is 5010, and the output from the pump 5000 is 5020. As before, fluid pumped can be a gas like air, or a liquid like water. The fin device 88 can be located at either the proximal or distal end of the Magnus cylinder drive shaft 1045 when viewed from the fluid flow 90 (not shown) perspective.

As previously discussed, the fin device 88 is generally located on Magnus cylinder drive shaft 1045, and is rotated by fluid flow 90. The imparted rotation from the fin device 88 (due to fluid flow 90) drives the shaft 1045, which in turn may drive the bevel gears 1050, 1055, 1060 and 1065. This rotational motion is then imparted into shafts 1205 and 1215, which rotates Magnus cylinders 1200 and 1210. An optional supplemental motor 1005 can also be attached to provide rotational motion for shaft 1045 to either increase the speed of rotation of the shaft 1045, or rotate it when flow 90 is insufficient to rotate fin means 90.

Often, at least two sets of bevel gears 1050 and 1060 may be located on shaft 1045 to drive the two Magnus cylinders (e.g., cylinder 1200 and cylinder 1210 attached to the central axes 1205 and 1215). Bevel gear 1055 may be attached to shaft 1215 that is positioned to be in communication with bevel gear 1050, and bevel gear 1065 may be attached to central axis 1205 which is positioned to be in communication with bevel gear 1060.

The rotary motion of the motor 1005 drives the rotation of the Magus cylinders through the series of bevel gears. If more power is needed, then additional Magnus cylinders can be added in pairs. As previously discussed, the belts 1021 and 1032 can be replaced with roller chain, cogged belt, v-belt, ribbed belt, or cable.

Figure 14:
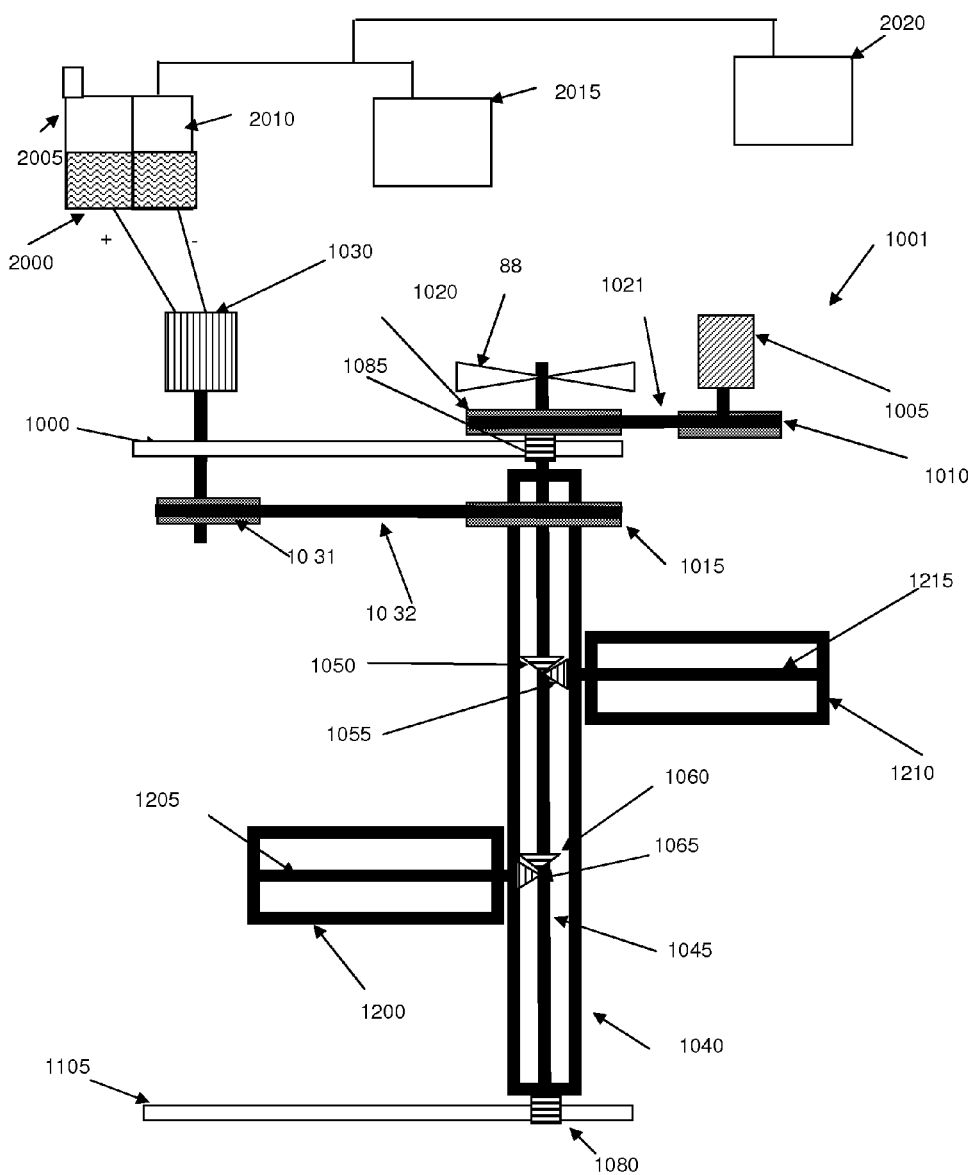
FIG. 14 is a schematic representation of a double concentric shaft used to drive the Magnus cylinders and transmit the power to the generator which then creates Hydrogen and oxygen.

In addition to generating work energy and electrical power, the system may also be used to provide stored chemical energy. For example, referring to FIG. 14, the electricity from the generator 1030 can be used in a reaction chamber 2000 for separating water into oxygen and hydrogen using the electrical current, thereby breaking water into an outflow means for the oxygen 2005 and an outflow means for the hydrogen 2010. The hydrogen can then be stored in a pressurized bottle 2015 or oxidized directly in a conventional generator 2020. As before, in FIG. 14, the fin device 88 is located on Magnus cylinder drive shaft 45 and is rotated by fluid flow 90.

FIG. 7 shows the power output for a 2 foot diameter Manus energy harvester with 4 Magnus cylinders again as shown in FIG. 4 in a water flow of at 2 feet per second as shown in FIG. 4, versus the rotation of the main power shaft in rotations per minute (RPM, RPMS). The power is determined from a generator attached to the main power shaft.

FIG. 8 shows the power output for a 2 foot diameter Manus energy harvester with 4 Magnus cylinders again as shown in FIG. 4, versus the rotation of Magnus cylinder in RPMS in a water flow of at 2 feet per second. The power is determined from a generator attached to the main power shaft. The output power increase as the rotational speed of the Magnus cylinder decrease due to reduction in head lost from the fin device need to rotate the Magnus cylinders at higher speeds.

FIG. 9 shows the general principles of how a rotating Magnus cylinder generates Magnus lifting force. Here, when the fluid flow 520 reaches the Magnus cylinder 500 which is rotating in direction 501, the flow is diverted around the cylinder causing higher pressure in flow stream 505, and lower pressure in flow stream 506. The gradient of flow stream 505 and flow stream 506 results in lift 510. This scheme is termed an on-axis Magnus system.

Figure 10:
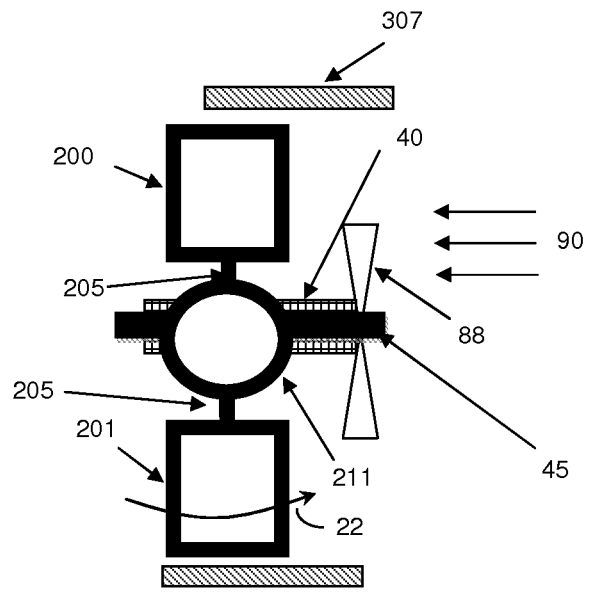
FIG. 10 is a schematic side representation of a radial device with planar rotating Magnus cylinders in an axial position within a tube.
Figure 11:
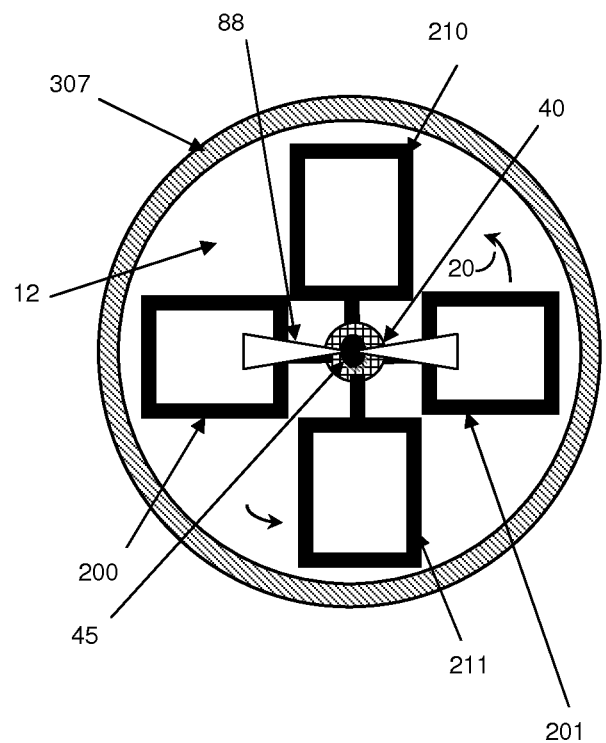
FIG. 11 is a schematic end representation of a radial device with planar rotating Magnus cylinders in an axial position within a tube.

Referring now to FIGS. 10 and 11, the energy harvester using the on-axis Magnus system of FIG. 9 is shown mounted to a structure where the energy harvester is in communication with a fluid flow 90. The energy harvester is comprised of side walls 307 that receive a flow 90. The central shaft 40 with Magnus cylinders 200, 201, 210, and 211 located thereon is mounted between the channel side walls 307. The fluid flow path is defined by an inflow fluid channel formed by channel walls 307. The fin device 88 is located on Magnus cylinder drive shaft 45, and as before is rotated by fluid flow 90. As previously described, the fin means increase the turbulence of the fluid, thereby reducing the drag of the Magnus cylinders. As before, the chamber walls can be curved (either in the side or bottom walls in this configuration) and can have opposite elevations in the plane parallel to the fluid flow path. Such curved or shaped wall can act as a concentrator for the fluid flow by channeling a greater volume of fluid to the energy harvester, again thereby increasing the speed of the fluid, which in turn will increase the lift generated by the cylinder. As previously discussed, used of such shaped or curve chamber walls for flow intensification purposes may be used in any of the embodiments envisioned by the present invention.

Figure 12:
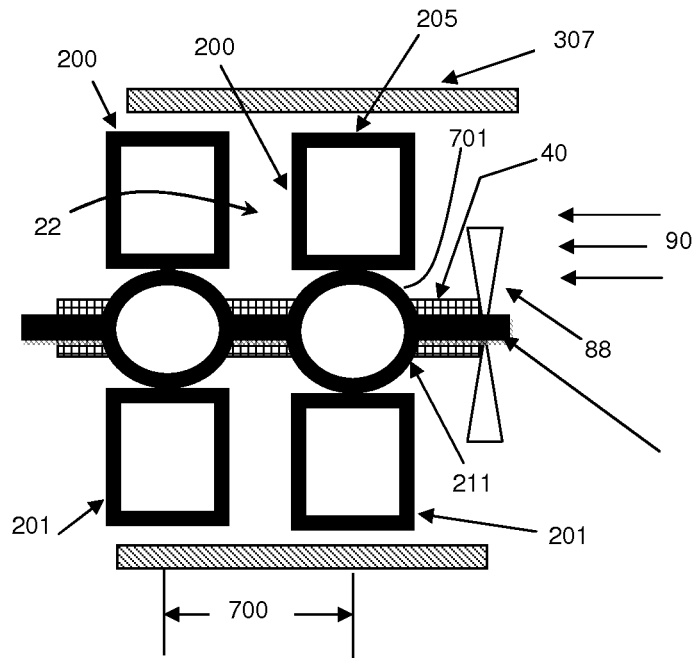
FIG. 12 is a schematic side representation of a radial device with double planar rotating Magnus cylinders in an axial position within a tube.
Figure 13:
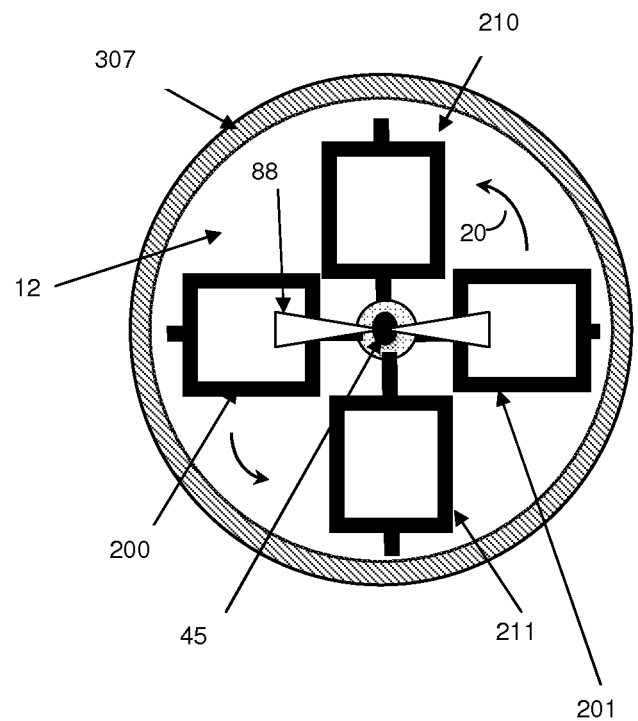
FIG. 13 is a schematic end representation of a radial device with double planar rotating Magnus cylinders in an axial position within a tube.

Referring now to FIGS. 12 and 13, the Magnus cylinder diameters can be sized and arranged in tandem so that the Magnus cylinders in a second (downstream) energy harvester benefit from the increase in water velocity caused by an initial (upstream) energy harvester. In this example, the dimension 700, corresponding to the separation between upstream and downstream Magnus cylinders, is equal to about 10 times the Magnus cylinder diameter 701.

As previously discussed, to increase the Magnus force lift, and the resulting torque on the power shaft, the subsequent downstream Magnus cylinders are typically placed or replicated within about 2-20 diameters of the upstream Magnus cylinders. As before, in any embodiment, the fluid flow 520 (FIG. 9) or 9 (FIGS. 10 and 11) can be hydraulic (e.g. water) or pneumatic (e.g. air). As before, in these figures, the fin device 88 is located on Magnus cylinder drive shaft 1045, and is again rotated by fluid flow 90. Again as before, the imparted rotation from fin device 88 (due to fluid flow 90) drives shaft 1045, which in turn drives the bevel gears 1050, 1055, 1060 and 1065 (previously shown in FIG. 6). Again as before, this rotational motion is then imparted into shafts 1205 and 1215, which rotate Magnus cylinders 1200 and 1210 (shown in FIG. 6) or Magnus cylinders 200, 201, 210, and 211 (shown in FIGS. 1,2 and 3). As previously discussed, an optional supplemental motor 1005 (shown in FIG. 6) can also be attached to provide rotational motion for shaft 1045 to either increase the speed of rotation of the shaft 1045, or rotate it when flow 90 is insufficient to rotate fin means 90. Here the fin device 88 is located on Magnus cylinder drive shaft 45, and again rotated by fluid flow 90.

In any application, the fluid flows can be the output flow streams of an effluent system. For example, the inflow fluid channel can be connected to one or more of a sewer, a water treatment facility, a water drain, a holding pond, aqueducts, a roof drain, outflow from a dam, an air conditioning line, and a holding tank.

Figure 15:
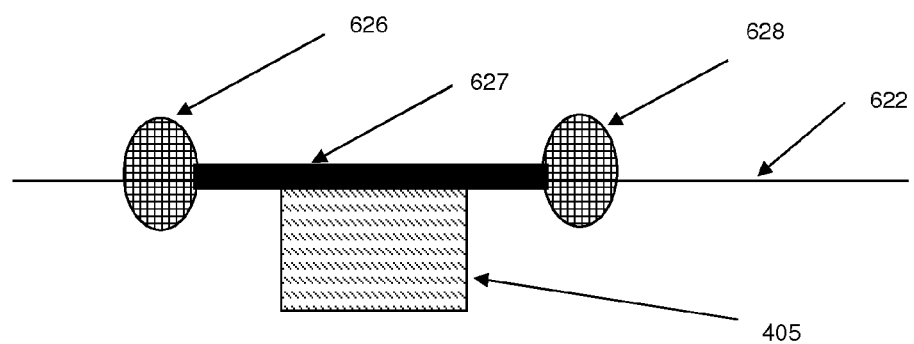
FIG. 15 is a schematic representation of an energy harvester of the invention floating on a barge structure.

Referring to FIG. 15 an energy harvester 405 of the present invention is attached to a barge comprised of deck 627 and pontoons 626 and 628. The water line is shown as 622.

Figure 16:
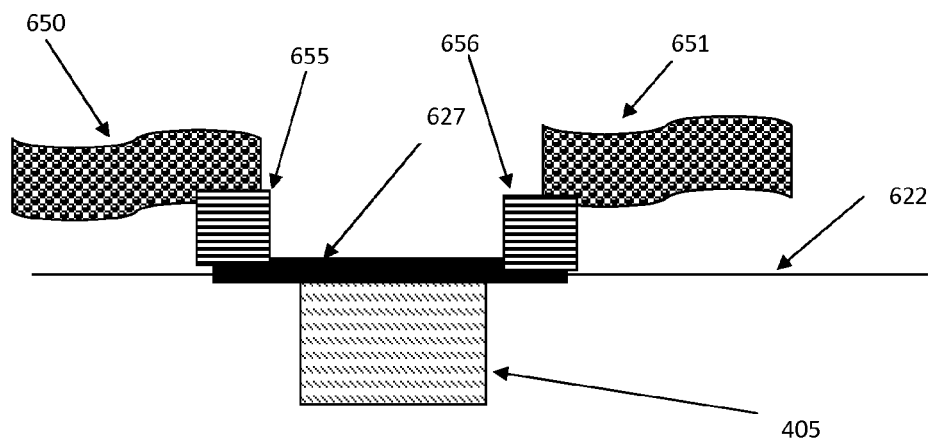
FIG. 16 is a schematic representation of an energy harvester of the invention attached to a bridge structure.

Referring to FIG. 16 an energy harvester 405 of the present invention is attached to a bridge structure comprised of deck 627, 650, 655, 656, and 651. The water line is shown as 622.

Figure 17:
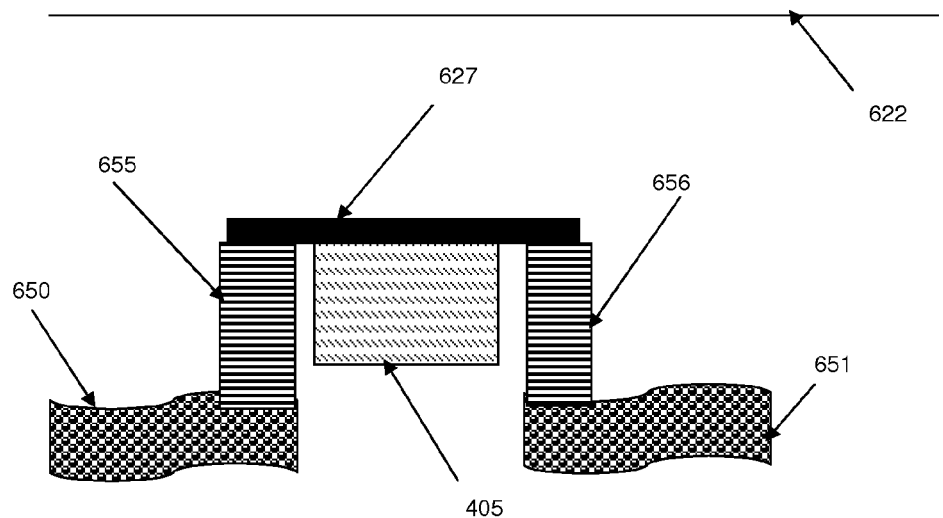
FIG. 17 is a schematic representation of an energy harvester of the invention attached to the bottom of the fluid channel by a bridge structure.

Referring to FIG. 17, an energy harvester 405 of the present invention is attached to a bottom of the fluid channel by deck 627 and pontoons 626 and 628. The water line is shown as 622.

Figure 18:
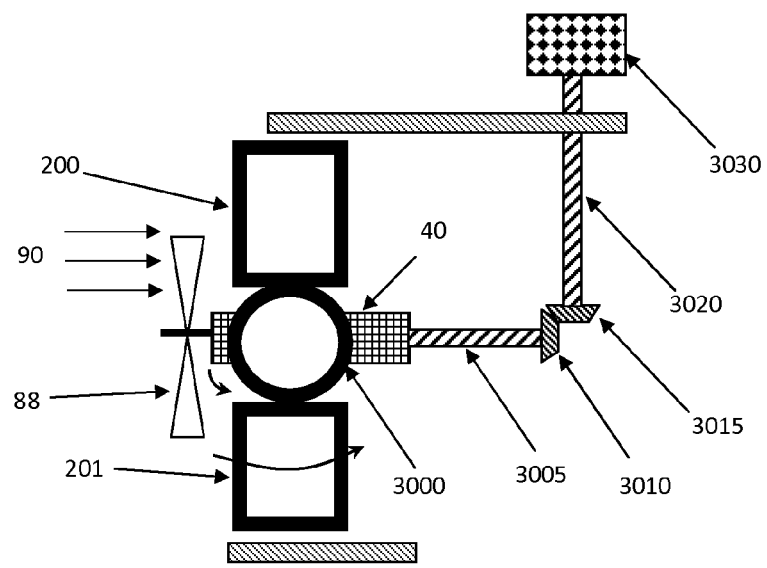
FIG. 18 is a schematic representation of an energy harvester using a gear train and drive shaft system.

Referring to FIG. 18, an energy harvester 3000 of the present invention having shaft 40 is connected to a generator 3030 with shaft 3005, gears 3010 and 3015, and shaft 3020 instead of a belt drive system as shown in FIG. 6.

Energy harvester 405 can also be connected directly to a device such as a sensor to provide power for the sensor. Typical applications include weather sensors, wave sensors, and under water current sensors.

The energy harvester can be attached to either a floating platform or a fixed platform depending on the conditions of the fluid that it is placed in.

Further discussion:

A particular advantage of this approach is that for either gas (e.g. wind) or fluid (e.g. water) applications, the invention can function under lower wind speed conditions and/or lower water flow conditions than conventional industrial generators. There are far more low wind and low water flow environments than there are high wind and high water flow environments, and thus the invention can extract more energy from the environment by taking better advantage of these low flow rate conditions.

A particular advantage of the current invention's radial mounted Magnus cylinder design is that this type of design is very scalable. Even as the size and number of the radially mounted Magnus cylinders increase, this increasing amount of harnessed Magnus force lifting energy can continue to be focused on a central rotating shaft, and the torque from this central shaft can be efficiently coupled to standard electrical generators and other mechanisms without the need for much if any intermediate gearing.

The invention's novel use of a fan Magnus cylinder rotation device, which can be configured to extract only enough energy from the incoming fluid (air or water) to rotate the Magnus cylinders, offers the additional advantages that the fan device also causes additional turbulence, with reduces the drag of the Magnus cylinders, so that they can rotate faster around the central shaft. This decrease in drag and increase in speed of rotation is beneficial to the generation of electrical energy, which generally operates at higher efficiency as the size of the electrical generator and the rotation speed of the generator increase.

In a hydro application embodiment, the energy harvester can be mounted in a self-floating configuration, and may be attached to a vessel or platform located in a current of 1 foot per second or greater, such as in a tidal channel. In such an embodiment, the energy harvester may be located just below the surface of the water, where the current velocity is greatest, and the harvester may be retained in that location by virtue of the rise and fall of the vessel with the water. The fan device may be attached to the energy harvester so that it to rises and falls with the water level, and is therefore in the optimal location to generate rotation of the drive shaft for the Magnus cylinders and induce the beneficial turbulence.

The rotary energy harvester embodiment is uniquely suited for this application. A housing to channel the flow to the energy harvester may be provided if desired, but is not necessary if the current velocity is sufficiently great. As in other embodiments, the energy harvester may be connected to a suitable electric generator, which may be mounted on the vessel in a water tight chamber or which may be remotely located. Since the energy harvester is located in the water, the lift is converted into mechanical energy to drive the generator.

Alternatively the flow can be concentrated so that the speed of the fluid passing the air or hydraulic cylinders is accelerated to increase the lift of the cylinder. Channeling the flow from a larger cross section into a smaller cross section where the cylinder can take advantage of the increased flow speed of the fluid facilitates an increase in the lift of the cylinder. This also allows the fan device to be larger than the flow channel so that the fan can develop the appropriate torque to rotatably drive the Magnus Cylinders.

Thus, putting these various features together, and as another example of another embodiment of the invention, the invention may be an energy harvester device comprising at least one Magnus cylinder with a first axis of rotation and a circumference. As before, this at least one Magnus cylinder may be affixed by a mechanism attached to its first axis of rotation to the outer portion of a central shaft that rotates on an axis substantially parallel to the direction of a fluid moving at a fluid velocity with a direction and speed.

This central shaft may have an axis of rotation, as well as a substantially cylindrical interior that also has a second inner shaft positioned inside the central shaft, and this inner shaft will be capable of rotating independently about the central shaft's axis of rotation. Here, at least one fin (such as a one turbine blade, Savonius turbine, screw, fan assembly, or other finned device) may be attached to this inner shaft, and this at least one fin may be positioned so as to produce torque in response to the moving fluid, thus rotating the central shaft about its axis of rotation.

The device will make use of suitable gearing or other force transuding mechanisms to translate the motion of this central shaft into the rotary motion of the various (at least one) Magnus cylinder(s) about their respective first axes. As a result, due to interactions with the moving fluid, the at least one Magnus cylinder will generates Magnus forces or "lift" that is capable of causing the outer portion of the central shaft to rotate in a direction that substantially parallel to the moving fluid, and causing the at least one Magnus cylinder to rotate about the central shaft in a direction substantially perpendicular to the direction of the moving fluid, in a manner not unlike a windmill.

For higher efficiency, often this at least one Magnus cylinder will be a plurality of Magnus cylinders, and at least some of this plurality of Magnus cylinders may be mounted on the same location on the outer cylinder (relative to the axis of rotation of this outer cylinder, and positioned equidistant from each other along the circumference of this outer cylinder). For still higher efficiency, often at least some of these Magnus cylinders may additionally be positioned on different locations on the outer cylinder (e.g. relative to the axis of rotation of the outer cylinder), so that at least some Magnus cylinders are downstream of other upstream Magnus cylinders. Ideally the location of the Magnus cylinders that are located downstream of other Magnus cylinders will be selected so that the distance between the upstream and downstream Magnus cylinders (along the axis of rotation of the outer cylinder) is between two and twenty times the circumference of the Magnus cylinders themselves.

In this embodiment, for higher efficiency, the fin and the gearing mechanism will be designed to causes the circumference of at least some, and preferably all of the Magnus cylinder(s) to move at a radial velocity that substantially greater than the speed of the fluid. To achieve further improvements in efficiency, this at least one fin may be positioned upstream (relative to the moving fluid) to at least some of the various Magnus cylinders. This fin will ideally be designed to induce or cause turbulence in the moving fluid that is of a great enough extent so as to reduce the resistance of the movement through this fluid of at least some of the various Magnus cylinders that are positioned downstream of this at least one fin. To harness the output of this device, the central shaft may be coupled to a mechanism that converts the movement (e.g. rotary motion) of the central shaft into useful work. Often this mechanism may be at least one electrical generator that in turn will produce electrical current and electrical power.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. An energy harvester device comprising at least one Magnus cylinder with a first axis of rotation and a circumference, said at least one Magnus cylinder affixed by a mechanism attached to said first axis of rotation to the outer portion of a central shaft that rotates on an axis substantially parallel to the direction of a moving fluid;
   said fluid moving at a fluid velocity with a direction and speed;
   said central shaft having an axis of rotation;
   at least one fin positioned so as to produce torque in response to said moving fluid;
   force transuding mechanisms to translate the torque produced by said at least one fin into rotary motion of said at least one Magnus cylinder about said first axis;
   Wherein said at least one Magnus cylinder generates Magnus forces capable of causing said outer portion of the central shaft to rotate in a direction substantially parallel to said moving fluid, and causing said at least one Magnus cylinder to rotate about said central shaft in a direction substantially perpendicular to said direction of said moving fluid;
   wherein said fin and said force transuding mechanisms cause said circumference of said Magnus cylinder to move at a radial velocity substantially greater than the speed of said fluid;
   and wherein said central shaft is coupled to a mechanism that converts the movement of said central shaft into useful work.

2. The energy harvester device of claim 1, wherein said fluid comprises air, wind or other moving gasses, as well as water, moving water, and other moving fluids.

3. The energy harvester of claim 2, wherein said fluid is obtained from effluent system, a sewer, a water treatment facility, a water drain, a holding pond, an aqueduct, a roof drain, an outflow from a dam, an air conditioning line, and a holding tank.

4. The energy harvester device of claim 1, wherein said at least one fin comprises at least one turbine blade, Savonius turbine, screw, fan assembly, or other finned device.

5. The energy harvester of claim 4, wherein said at least one fin is positioned upstream relative to said moving fluid to at least some of said at least one Magnus cylinders, and wherein said at least one fin is configured to cause turbulence in said moving fluid so as to reduce the resistance of the movement through said fluid of said at least one Magnus cylinders positioned downstream of said at least one fin.

6. The energy harvester device of claim 1, wherein said energy harvester device is mounted in a fluid flow path defined by an inflow fluid channel and an outflow fluid channel, and positioned inside a chamber disposed between said inflow fluid channel and said outflow fluid channel.

7. The energy harvester device of claim 1, wherein said at least one Magnus cylinder is a plurality of said Magnus cylinders, and where at least some of said plurality of Magnus cylinders are mounted on the same location on said outer cylinder relative to the axis of rotation of said outer cylinder, and positioned equidistant from each other along the circumference of said outer cylinder, or in which at least some of said plurality of Magnus cylinders are positioned on different locations on said outer cylinder relative to the axis of rotation of said outer cylinder, so that at least some Magnus cylinders are downstream of other upstream Magnus cylinders.

8. The energy harvester device of claim 7, wherein the location of said at least some Magnus cylinders that are located downstream of other Magnus cylinders is selected so that the distance between said upstream and downstream Magnus cylinders along said axis of rotation of said outer cylinder is between two and twenty times the circumference of said Magnus cylinders.

9. The energy harvester of claim 1, wherein the torque produced by said at least one fin is assisted or enhanced by a motor which is operable under electric, pneumatic, or hydraulic power.

10. The energy harvester of claim 1, wherein said mechanism that converts the movement of said central shaft into useful work is at least one electrical generator, and said useful work is produced by the production of electrical current by said electrical generator.

11. The energy harvester of claim 1, wherein said mechanism that converts the movement of said central shaft into useful work is a reaction chamber that converts water into hydrogen and oxygen, a pump, or a mill.

12. The energy harvester of claim 1, wherein said harvester is attached to a floating or non-floating platform.

13. The energy harvester of claim 1, wherein said central shaft having an axis of rotation has a substantially cylindrical interior with a second inner shaft positioned inside said central shaft, and capable of rotating independently about said axis of rotation;
   wherein said at least one fin is attached to said inner shaft, and said at least one fin is positioned so as to produce torque in response to said moving fluid and rotate said central shaft about said axis of rotation;
   and wherein said force transuding mechanism is a gearing mechanism or other force transuding mechanism.

14. An energy harvester device comprising at least one Magnus cylinder with a first axis of rotation and a circumference, said at least one Magnus cylinder affixed by a mechanism attached to said first axis of rotation to the outer portion of a central shaft that rotates on an axis substantially parallel to the direction of a moving fluid;

said fluid moving at a fluid velocity with a direction and speed;

said central shaft having an axis of rotation and a substantially cylindrical interior with a second inner shaft positioned inside said central shaft, and capable of rotating independently about said axis of rotation;

at least one fin attached to said inner shaft, said at least one fin positioned so as to produce torque in response to said moving fluid; and rotate said central shaft about said axis of rotation;

gearing or force transuding mechanisms to translate the motion of said central shaft into rotary motion of said at least one Magnus cylinder about said first axis;

Wherein said at least one Magnus cylinder generates Magnus forces capable of causing said outer portion of the central shaft to rotate in a direction substantially parallel to said moving fluid, and causing said at least one Magnus cylinder to rotate about said central shaft in a direction substantially perpendicular to said direction of said moving fluid;

wherein said fin and said gearing mechanism cause said circumference of said Magnus cylinder to move at a radial velocity substantially greater than the speed of said fluid;

wherein said at least one fin is positioned upstream relative to said moving fluid to at least some of said at least one Magnus cylinders, and wherein said at least one fin is configured to cause turbulence in said moving fluid so as to reduce the resistance of the movement through said fluid of said at least one Magnus cylinders positioned downstream of said at least one fin;

wherein said central shaft is coupled to a mechanism that converts the movement of said central shaft into useful work; and wherein said mechanism that converts the movement of said central shaft into useful work is at least one electrical generator, and said useful work is produced by the production of electrical current by said electrical generator.

15. The energy harvester device of claim 14, wherein said fluid comprises air, wind or other moving gasses, as well as water, moving water, and other moving fluids.

16. The energy harvester of claim 15, wherein said fluid is obtained from effluent system, a sewer, a water treatment facility, a water drain, a holding pond, an aqueduct, a roof drain, an outflow from a dam, an air conditioning line, and a holding tank.

17. The energy harvester device of claim 14, wherein said at least one fin comprises at least one turbine blade, Savonius turbine, screw, fan assembly, or other finned device.

18. The energy harvester device of claim 14, wherein said energy harvester device is mounted in a fluid flow path defined by an inflow fluid channel and an outflow fluid channel, and positioned inside a chamber disposed between said inflow fluid channel and said outflow fluid channel.

19. The energy harvester device of claim 14, wherein said at least one Magnus cylinder is a plurality of said Magnus cylinders, and where at least some of said plurality of Magnus cylinders are mounted on the same location on said outer cylinder relative to the axis of rotation of said outer cylinder, and positioned equidistant from each other along the circumference of said outer cylinder, or in which at least some of said plurality of Magnus cylinders are positioned on different locations on said outer cylinder relative to the axis of rotation of said outer cylinder, so that at least some Magnus cylinders are downstream of other upstream Magnus cylinders.

20. The energy harvester device of claim 19, wherein the location of said at least some Magnus cylinders that are located downstream of other Magnus cylinders is selected so that the distance between said upstream and downstream Magnus cylinders along said axis of rotation of said outer cylinder is between two and twenty times the circumference of said Magnus cylinders.

21. The energy harvester of claim 14, wherein the torque produced by said at least one fin is assisted or enhanced by a motor which is operable under electric, pneumatic, or hydraulic power.

22. An energy harvester device comprising at least one Magnus cylinder with a first axis of rotation and a circumference, said at least one Magnus cylinder affixed by a mechanism attached to said first axis of rotation to the outer portion of a central shaft that rotates on an axis substantially parallel to the direction of a moving fluid;

said fluid moving at a fluid velocity with a direction and speed;

said central shaft having an axis of rotation and a substantially cylindrical interior with a second inner shaft positioned inside said central shaft, and capable of rotating independently about said axis of rotation;

at least one fin attached to said inner shaft, said at least one fin positioned so as to produce torque in response to said moving fluid; and rotate said central shaft about said axis of rotation;

wherein said at least one fin comprises at least one turbine blade, Savonius turbine, screw, fan assembly, or other finned device;

gearing or force transuding mechanisms to translate the motion of said central shaft into rotary motion of said at least one Magnus cylinder about said first axis;

Wherein said at least one Magnus cylinder generates Magnus forces capable of causing said outer portion of the central shaft to rotate in a direction substantially parallel to said moving fluid, and causing said at least one Magnus cylinder to rotate about said central shaft in a direction substantially perpendicular to said direction of said moving fluid;

wherein said at least one Magnus cylinder is a plurality of said Magnus cylinders, and where at least some of said plurality of Magnus cylinders are mounted on the same location on said outer cylinder relative to the axis of rotation of said outer cylinder, and positioned equidistant from each other along the circumference of said outer cylinder, or in which at least some of said plurality of Magnus cylinders are positioned on different locations on said outer cylinder relative to the axis of rotation of said outer cylinder, so that at least some Magnus cylinders are downstream of other upstream Magnus cylinders;

wherein the location of said at least some Magnus cylinders that are located downstream of other Magnus cylinders is selected so that the distance between said upstream and downstream Magnus cylinders along said axis of rotation of said outer cylinder is between two and twenty times the circumference of said Magnus cylinders;

wherein said fin and said gearing mechanism causes said circumference of said Magnus cylinder to move at a radial velocity substantially greater than the speed of said fluid;

wherein said at least one fin is positioned upstream relative to said moving fluid to at least some of said at least one Magnus cylinders, and wherein said at least one fin is configured to cause turbulence in said moving fluid so as to reduce the resistance of the movement through said fluid of said at least one Magnus cylinders positioned downstream of said at least one fin;

wherein said central shaft is coupled to a mechanism that converts the movement of said central shaft into useful work; and wherein said mechanism that converts the movement of said central shaft into useful work is at least one electrical generator, and said useful work is produced by the production of electrical current by said electrical generator.

23. The energy harvester device of claim 22, wherein said energy harvester device is mounted in a fluid flow path defined by an inflow fluid channel and an outflow fluid channel, and positioned inside a chamber disposed between said inflow fluid channel and said outflow fluid channel.

24. The energy harvester of claim 22, wherein the torque produced by said at least one fin is assisted or enhanced by a motor which is operable under electric, pneumatic, or hydraulic power.

25. The energy harvester of claim 22, wherein said harvester is attached to a floating or non-floating platform.

* * * * *